March 30, 1954     H. J. LOVEGROVE ET AL     2,673,959
MOVING COIL ELECTRICAL INSTRUMENT
Original Filed Jan. 8, 1945     2 Sheets-Sheet 1

Inventors:
HENRY JOSEPH LOVEGROVE
MAURICE GRAHAM McBRIDE

BY Brown, Jackson, Boettcher & Dienner
Attorneys

March 30, 1954     H. J. LOVEGROVE ET AL     2,673,959
MOVING COIL ELECTRICAL INSTRUMENT
Original Filed Jan. 8, 1945     2 Sheets-Sheet 2

Inventors:
HENRY JOSEPH LOVEGROVE
MAURICE GRAHAM MC BRIDE
By Brown, Jackson, Boettcher & Dienner
Attorneys Patented Mar. 30, 1954

2,673,959

UNITED STATES PATENT OFFICE 2,673,959

MOVING COIL ELECTRICAL INSTRUMENT

Henry Joseph Lovegrove and Maurice Graham McBride, Enfield, England, assignors to Sangamo Electric Company, Springfield, Ill., a corporation of Illinois Original application January 8, 1945, Serial No. 571,872. Divided and this application December 6, 1950, Serial No. 204,387

3 Claims. (Cl. 324—150)

The present invention concerns improvements in or relating to moving coil electrical measuring instruments and it has for its object an improved construction by which an enlarged scale range may be obtained and in addition other advantages as will be pointed out hereafter. The present application is divisional of our copending application Serial No. 571,872, filed January 18, 1945, now issued as Patent No. 2,572,639, granted October 23, 1951.

According to the invention in order to obtain a large angular scale range the moving coil electrical measuring instrument is provided with two pole pieces, one consisting of an annular core which is surrounded for a large angular range by the other pole piece, leaving a narrow air gap which is traversed by one side of the moving coil, the other side of the coil passing through the hole in the annular core, the annular core being formed of the two parts both of solid magnetic material, one consisting of an annular member having a gap therein to permit of the coil being located in position and the other part being adapted to fit neatly in the core to complete the gap.

It has already been proposed to obtain in a moving coil instrument a scale extending over 270° between an inner annular member and an outer magnetic member but in this case the inner annular member was formed of laminations which had to be fed alternately from opposite sides through the moving coil before the core was assembled.

An advantage of the present invention is that the core can be readily machined either for the purpose of altering the scale or for the adaptation of the instrument for use as a ratiometer, ohmmeter or the like.

A subsidiary feature of the invention concerns the provision of a C-shaped permanent magnet with like poles at each end and like or consequent poles at the middle, the end poles being connected to the outer pole piece and the adjacent poles to the inner pole piece.

According to a further subsidiary feature of the invention, the pivots and pivot bases are mounted on the coil so avoiding the use of a separate staff.

According to a further subsidiary feature of the invention an electrical circuit is provided for increasing the sensitivity of the instrument when used as a ratiometer for measuring small variations of ratio, the elements of the circuit being made small and fitted within the instrument casing so that the only terminals required are for the power supply and the resistance to be measured.

The invention will be better understood by referring to the accompanying drawings in which.

Figure 2:
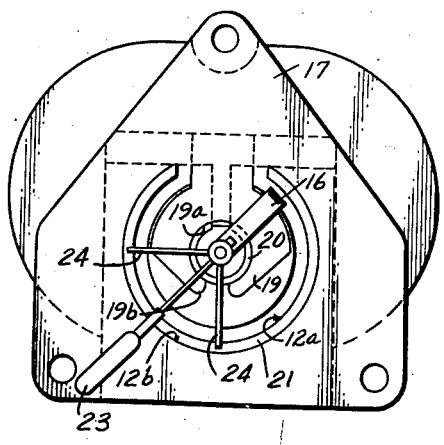
Fig. 2 shows an end view.
Figure 3:
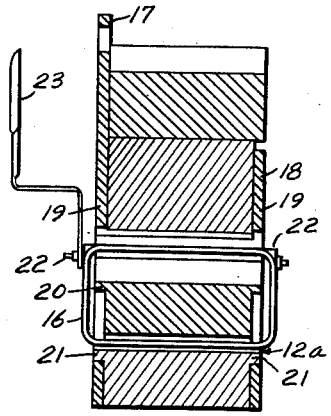

Fig. 3 a sectional elevation of Fig. 2.

Figure 4:
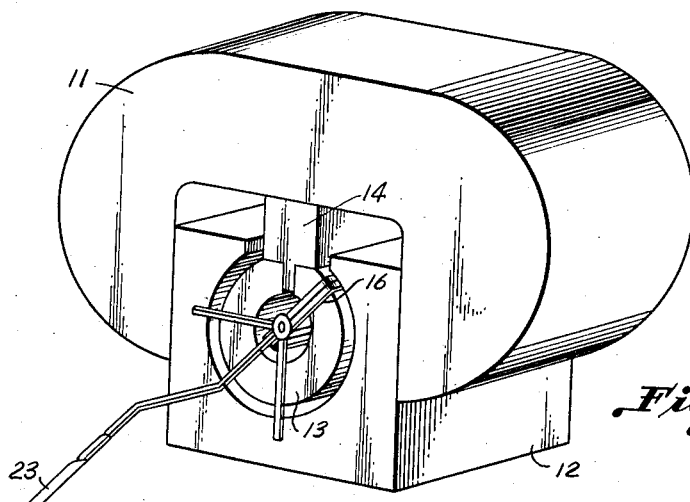
Figure 5:
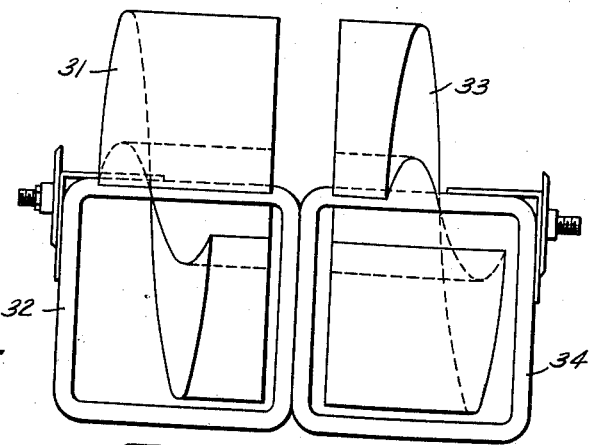
Figure 6:
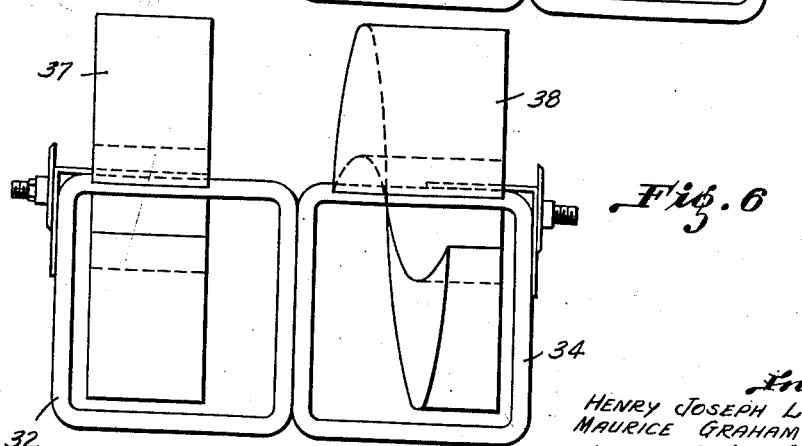

Fig. 4 shows a perspective view of a ratiometer having two coils side by side, while Fig. 5 and Fig. 6 indicate alternative designs of ratiometer in which the inner pole piece is divided into two parts and the coils are arranged in the same plane.

Figure 1:
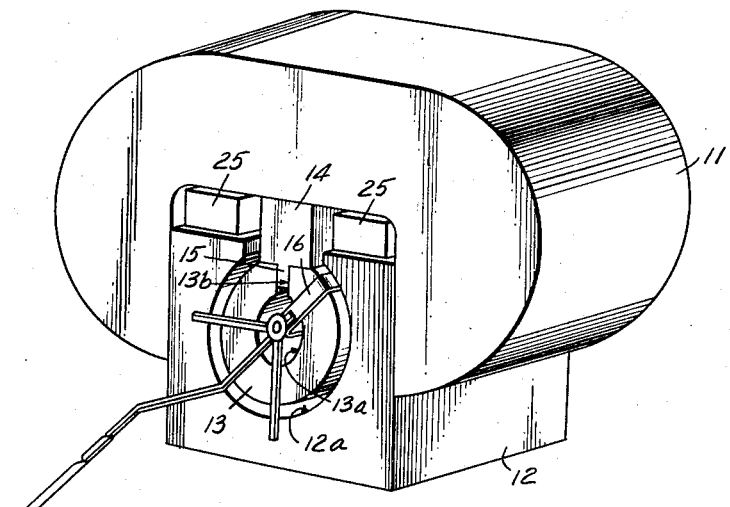
Fig. 1 shows a perspective view of a single coil moving scale instrument.

Referring to Figs. 1 to 3 of the drawings it will be seen that the moving coil instrument consists of a C-shaped permanent magnet 11 having an outer pole piece 12 consisting of a rectangular block, the end faces of which abut on the end faces of the C-shaped magnet 11 and having a circular hole extending from side to side which is approximately equally spaced from the two end faces and is nearer to the face opposite the inner central part of the C-shaped magnet so that there is a gap extending the full width of this face. The inner pole piece is formed of two parts 13 and 14, the part 13 it will be noted consists of an annular core having a small gap 13b which serves to allow the coil 16 being placed in position. The coil 16 it will be noted embraces the limb of the annular core having one side thereof extending through the hole 13a in the core and the other side in an arcuate gap 12a between the pole pieces 12 and 13. The part 14 consists of a rectangular member shaped so as to have a projection 15 for fitting in the gap 13b and serving to connect magnetically the centre of the C-shaped permanent magnet 11 to the annular core 13 both magnetically and mechanically. The pole-piece 12, the annular core 13 and the rectangular block 14 are all made of solid magnetic material so that they can be readily machined and shaped as required and furthermore a good fit can be provided between the magnetic surfaces, the reluctance of which should be as low as possible.

The C-shaped magnet is magnetised so as to have like polarity at each end and like poles at the centre so that the direction of magnetic flux in the arrangement illustrated is always in one direction either from the outer pole piece to the inner pole piece or vice versa. End plates such as 17 and 18 may be provided for securing the component parts together, these being shaped as shown in Figs. 2 and 3. Each end plate 17, 18 has a relatively long arcuate slot 12b therein which registers with the arcuate air gap 12a defined between the outer and inner pole pieces 12 and 13. Defined within this arcuate slot 12b is a downwardly extending hanger or tongue portion 19. This hanger portion has an axial opening 19a therein from the bottom of which extends an assembly slot 19b. The coil 16 embraces this hanger portion 19, and the inner side of the coil can be assembled up into the opening 19a through the assembly slot 19b. In order that the outer pole piece 12 and inner core 13 be maintained in accurate concentric alignment, an annular registering rib 20 projects outwardly from each end of the core 13 for centering engagement in the axial opening 19a of the hanger portion 19, and an arcuate registering rib 21 projects outwardly from each end of the block 12 for like centering engagement in the arcuate slot 12b of each end plate. However, it will be understood that if required either pole piece or core or both pole piece and core could be separately located in jigs and bolted into position. The coil 16 is wound on a former in well-known way but in the present invention instead of providing a separate bearing shaft the pivot bases 22 and pivots are mounted on the coil. Furthermore the pointer 23, and balance weights 24 which are necessary owing to the eccentricity of the coil, are also secured to one of the pivot bases as shown. Compensation for temperature can be effected by inserting pieces of metal 25 whose magnetic properties vary with temperature in the recesses between the upper side of the block forming the outer pole piece and the centre of the permanent magnet.

It will of course be understood that while in the arrangement shown the annular member is coaxial with the inner cylindrical surface of the outer pole piece, this is not essential but it is desirable whenever a substantially uniform magnetic field is required in order to obtain a uniform scale. Control springs, not shown are provided on the instrument preferably being secured in known manner to the pivot bases on the coil.

The design of instrument described with reference to Figs. 1 to 3 lends itself to a very convenient form of ratiometer, a description of which will be given with reference to Figs. 4 to 6. Like reference numbers are used for similar parts that is to say, 11 represents the C-shaped magnet with consequent poles, 12 represents the rectangular block between the end faces of the C-shaped magnet, 13 represents the annular core which in this case may be specially shaped, 14 represents the rectangular connecting block, 16 represents the former on which the two coils are wound and 23 represents the pointer.

In the arrangement shown in Fig. 4 it will be noted that the annular core 13 is so shaped that the gap between the annular core and the inner cylindrical surface of the lateral hole extending from side to side of the rectangular block 12 has a varying width so as to provide a magnetic field which varies in strength round its circumference so that at all times the two windings on the coil arranged side by side operate in fields of different strength. Currents through the coils therefore cause forces to be generated dependent upon the product of the mean strength of the field in which the coils lie and the current flowing in the coils. This results in the coil taking up a position where the two forces are equal and thereby the pointer can indicate on a scale the ratio of the two currents.

The general operation resembles that described in connection with our British Patent No. 556,258 as does also the construction and arrangement of winding of the coils. In this case however there is only one side of the coil which works in the gap and the other works in the hole in the annular core and therefore the windings therein are not subject to any forces created by the currents flowing in the side of the windings in the core.

In Fig. 5 the annular core is made up of two parts 31 and 33, while the coils 32 and 34 are arranged so as to lie in the same plane. The two parts of the core would be slotted to permit of the coil being placed in position and would be secured together by means of the connection with the rectangular bar and its projecting piece for entering into the slots of both parts of the core. As illustrated the annular core is of circular section as regards the outer face, that is the face facing the air gap, but is of varying widths.

In Fig. 5 it will be noted that the maximum width of the part 31 is in juxtaposition to the minimum width of the part 33 and vice versa. Consequently when one coil is in a field for substantially the whole length of one side, the other coil is in a field for only a small part of the length of one side. There is however a mid position when both coils lie in fields of equal strength and of equal length and this is the position which the coil takes up when the currents therein are equal assuming of course the number of turns and other conditions are equal. Any variation of strength of the current in one coil with respect to the other will result in a movement of the coils until they take up a position where the relation of the magnetic fields is inversely proportional to the ratio of the currents. The arrangement shown in Fig. 6 closely resembles that shown in Fig. 5 as in this case one of the parts of the annular core 37 is of uniform section, while the other part 38 corresponds in shape to either of the parts 31 or 33 of Fig. 5.

The construction of the coils and the operation is similar except of course that the variations of ratio for which the instrument will cater are less. This arrangement will therefore give a more open scale for small variations of ratio of currents in the two coils.

The ratiometer as described is adapted for use as it stands with direct current operation only as if alternating current is applied the variation of direction causes the device to become unstable and the pointer of the instrument will go to either one extreme position or another, that is to say while it may function alright for one half cycle it will not function for the other half cycle and the pointer may take up any position as it is not constrained by electromagnetic torques. By employing a rectifier however it is possible to make this device function satisfactorily. Smoothing is not necessary and a transformer can adjust the voltage desirable working limits if the source of supply is too high or too low.

A no-volt indicator can conveniently be incorporated in the ratiometer described with reference to Figs. 4 or 5 or 6 and the moving element may be of soft iron with a restoring spring to return it to a definite position when energy is not connected. Alternatively a magnet steel of high coercive value may be employed for the moving element which is polarised so that when energy is not connected to the instrument the moving element assumes one position and is held definitely in this position by leakage flux from the main permanent magnet system of the instrument. When energy is connected to the instrument, flux is set up by the coil which overcomes the leakage flux and causes the element to take up a new position indicating that the ratiometer is functioning correctly.

In connection with ratiometers due to the large degree of movement care has to be taken in the design of the ligaments. Conveniently these are made very thin and of rectangular cross section. The length of the ligament is preferably about double the distance between the pivot of the coil and the stationary abutment where it is secured. The ligament is mounted at the moving end approximately on a line passing through the pivoting center, and at the fixed end on a line approximately at right-angles to the line joining the pivoting center to the fixed abutment.

What we claim is:

1. In a moving coil electric measuring instrument of the class described, the combination of a single C-shaped permanent magnet having consequent magnetic poles of one polarity at its center and terminal magnetic poles of the other polarity at its ends, stationary outer and inner pole pieces joined to the terminal end poles and to the consequent central poles respectively of said permanent magnet, said stationary outer pole piece having a substantially cylindrical opening extending therethrough, said stationary inner pole piece comprising two substantially cylindrical hollow core sections disposed in axial alignment in the cylindrical opening of said outer pole piece and having their adjacent ends axially separated, the cylindrical outer surfaces of both hollow core sections being spaced substantially uniform radial distances from the inner surface of said cylindrical opening in the outer pole piece to define radially extending arcuate magnetic gaps between each core section and said outer pole piece of substantially uniform radial dimension, said two inner core sections being so connected to said permanent magnet as to be of the same magnetic polarity as the consequent central poles of said permanent magnet, and said outer pole piece being so connected to the terminal end poles of said permanent magnet as to be of the opposite magnetic polarity, a pivotally mounted moving system comprising two coils axially separated and embracing each of said axially separated hollow core sections, said coils having their inner side legs passing through the axial holes in their respective hollow core sections and having their outer side legs passing through said magnetic gaps, one of said hollow core sections comprising a spirally sloping end surface having one direction of pitch and the other hollow core section comprising a spirally sloping end surface having the opposite direction of pitch, whereby said two core sections present respectively increasing and decreasing widths of peripheral pole surfaces to their respective air gaps and coils for causing said coils to take up a rotary position corresponding to the ratio of the currents flowing in them.

2. In a ratiometer of the class described, the combination of an integral substantially C-shaped permanent magnet comprising a one-piece solid upper portion having consequent magnetic poles in the center of said solid upper portion, and comprising spaced lower side arms integral with said one-piece solid upper portion and terminating in substantially vertical inwardly facing polar end surfaces, an outer pole piece having substantially vertical outwardly facing end surfaces abutting against the inwardly facing polar end surfaces of said lower side arms and spaced downwardly from the solid upper portion of said C-shaped permanent magnet, said outer pole piece having a substantially circular hole extending longitudinally therethrough and opening upwardly through the top of said outer pole piece, an inner pole piece comprising two substantially cylindrical hollow core sections disposed in axial alignment in the cylindrical opening of said outer pole piece and having their adjacent ends axially separated, the cylindrical outer surfaces of both hollow core sections being spaced substantially uniform radial distances from the inner surface of said cylindrical opening in the outer pole piece to define arcuate magnetic gaps between each of said two core sections and said outer pole piece of substantially uniform radial dimension, a pivotally mounted moving system comprising two coils axially separated and embracing each of said axially separated hollow core sections, said coils having their inner side legs passing the axial holes in their respective hollow core sections and having their outer side legs passing through said magnetic gaps, each of said hollow core sections comprising an integral substantially C-shaped portion comprising a solid bottom portion and a longitudinal slot in its upper portion opening upwardly therefrom to permit the inner side leg of its respective coil to be inserted into the axial bore of said core section, a block of magnetic material comprising a tongue fitting into the longitudinal slots in both of said hollow core sections after the coils have been assembled therein, said tongue extending substantially the entire axial length of both hollow core sections, the top side of said block pressing upwardly against the under side of the solid upper portion of said permanent magnet in registration with said consequent poles whereby both of said hollow core sections have the same magnetic polarity as said consequent poles, one of said hollow core sections having a spirally sloping end surface whereby said core section presents a varying width of peripheral pole surface to its respective air gap so that the coil moving in said gap will move in a field of varying strength in the rotary motion of said moving system.

3. In a ratiometer of the class described, the combination of an integral substantially C-shaped permanent magnet comprising a one-piece solid upper portion having consequent magnetic poles in the center of said upper portion, and downwardly and inwardly turned end portions terminating in parallel, substantially vertical inwardly facing end surfaces having terminal magnetic poles therein, said permanent magnet being of single one-piece construction extending from one of said inwardly facing polar end surfaces entirely around the structure to the other inwardly facing polar end surface, whereby the permanent magnet is characterized by a relatively long length of magnet structure within a given outer dimension and relatively short length of spacing between the opposite inwardly facing polar end surfaces, an outer pole piece in the form of an approximately rectangular block of soft iron having substantially parallel, vertical outwardly facing end surfaces abutting against the inwardly facing polar end surfaces of said permanent magnet, said outer pole piece having a substantially circular hole extending longitudinally therethrough and opening upwardly through the top of said outer pole piece, an inner pole piece comprising two substantially cylindrical hollow core sections disposed in axial alignment in the substantially circular hole of said outer pole piece and having their adjacent ends axially separated, the cylindrical outer surfaces of both hollow core sections being spaced substantially uniform radial distances from the inner surface of said circular hole in the outer pole piece to define radially extending arcuate magnetic gaps between said two core sections and said outer pole piece of substantially uniform radial dimension, a pivotally mounted moving system comprising two coils axially separated and embracing each of said axially separated hollow core sections, said coils having their inner side legs passing through the axial holes in their respective hollow core sections and having their outer side legs passing through said magnetic gaps, said two hollow core sections each having a longitudinal slot therein to permit the inner side leg of its respective coil to be inserted into the axial bore of its respective hollow core section, and a block of magnetic material joined to the consequent poles of said permanent magnet and comprising a tongue extending into the longitudinal slots in both of said hollow core sections whereby said hollow core sections have the same magnetic polarity as said consequent poles, one of said hollow core sections comprising a spirally sloping end surface having one direction of pitch and the other hollow core section comprising a spirally sloping end surface having the opposite direction of pitch, whereby said two core sections present respectively increasing and decreasing widths of their peripheral pole surfaces to their respective air gaps and coils for causing said coils to take up a rotary position corresponding to the ratio of the currents flowing in them.

HENRY JOSEPH LOVEGROVE.
MAURICE GRAHAM McBRIDE.

References Cited in the file of this patent

UNITED STATES PATENTS

| Number | Name | Date |
|---|---|---|
| 1,171,907 | Trent | Feb. 15, 1916 |
| 1,918,023 | Faus | July 11, 1933 |
| 2,218,376 | Corson | Oct. 15, 1940 |
| 2,346,683 | Hickok | Apr. 18, 1944 |
| 2,367,950 | Lenehan | Jan. 23, 1945 |

FOREIGN PATENTS

| Number | Country | Date |
|---|---|---|
| 483,539 | Great Britain | Apr. 21, 1938 |